June 11, 1968    P. ERDENBERGER    3,387,960
APPARATUS FOR DISTRIBUTING MELT AND FORMING FIBERS THEREFROM
Filed June 16, 1965    2 Sheets-Sheet 1

PETER ERDENBERGER
INVENTOR.

BY *John Kenneth Rise*
ATTORNEY

June 11, 1968 P. ERDENBERGER 3,387,960
APPARATUS FOR DISTRIBUTING MELT AND FORMING FIBERS THEREFROM
Filed June 16, 1965 2 Sheets-Sheet 2

PARALLEL TO AXIS OF ROTOR

PETER ERDENBERGER
INVENTOR.

BY *John Kenneth Orise*
ATTORNEY 3,387,960
APPARATUS FOR DISTRIBUTING MELT AND
FORMING FIBERS THEREFROM
Peter Erdenberger, Wabash, Ind., assignor to United States
Gypsum Company, a corporation of Delaware
Filed June 16, 1965, Ser. No. 464,274
9 Claims. (Cl. 65—15)

ABSTRACT OF THE DISCLOSURE

A plate subjacent the outlet port of a forehearth is provided with two or more openings therethrough to discharge melt as a plurality of discrete spaced freely falling stream segments directly to the upwardly exposed inner surface of an annular orifice area in the side wall of a rotor which is disposed at an angle beneath the outlet port of the forehearth. The number, size and arrangement of the openings is selected to obtain the desired distribution of the melt across the width of the orifice area of the rotor wall.

---

This invention relates to an apparatus and method for transferring glass in a stream or ribbon having an elongate cross section and is particularly useful in combination with a fiberizing rotor whereby more uniform distribution of the melt to the fiberizing orifices is achieved.

According to known methods of making glass fibers, glass melt is deposited on the interior of a rotor and, by centrifugal force, is caused to flow through orifices in the side wall of the rotor, each orifice producing a single fiber. The size of the fiber is determined to some extent by the amount of melt supplied to the orifice, an excess of melt producing unacceptably coarse fibers.

Commercial production rates require the use of 5,000 to 10,000 orifices on the centrifuge, necessitating a sidewall about two inches or more in width to accommodate this great number. Each orifice must receive an adequate supply of melt to form its fiber, but an excess must be avoided to restrict the fiber diameter to a useful size.

Glass melt may be supplied from a forehearth to the rotor at a rate of 500 to about 1500 pounds per hour and at a temperature of 1800° F. to 2200° F. in the form of a stream of about one inch diameter so that not all of the orifices receive melt directly. Increasing the stream diameter so it covers all the orifices disposed over a two inch width seriously overloads the rotor. Stream shaping devices to modify the configuration of a smaller stream have been ineffective because the surface tension of the molten glass rapidly reforms the stream into one having a circular cross section. Apportioning this quantity of very hot melt to the orifices has remained a problem.

What is desired is a reliable distributor of simple construction to supply glass melt evenly to orifices over an area several inches wide on the side wall of the rotor. The distribution pattern should be readily adjustable but once determined should remain substantially constant over a considerable range of melt flow rate. It is an object of this invention to provide such a device.

It is a further object of this invention to provide an apparatus and method for distributing glass melt to the orifices of a fiberizing centrifuge. It is a still further object of this invention to provide an apparatus and method for distributing glass melt which is readily controllable and adjustable without interrupting the operation. It is another object of this invention to provide a freely falling glass stream which has a low apparent density. It is a still further object of this invention to provide a freely falling glass stream which has an elongate transverse cross section substantially throughout its length.

Other objects and advantages of this invention will become apparent and be more fully understood when reference is made to the detailed description thereof which follows and to the accompanying drawings.

These objects are achieved by the provision of a bushing adjacent the forehearth outlet which provides a glass stream consisting of a plurality of parallel closely adjacent segments. In a preferred embodiment, these segments are aligned so that the stream has an elongate cross section approximating a ribbon. In another embodiment, the segments are arranged so that their projections overlap on a plane parallel to the long axis of the stream so that when viewed normal to the plane, a continuous stream is observed. By varying the orientation of the long axis of the stream relative to the axis of the rotor, the effective width of the stream may be modified and, therefore, a greater measure of control exercised than heretofore possible.

Referring now to the drawings, FIGURE 1 shows a fiberizing rotor and associated attenuating apparatus positioned beneath a forehearth adapted to discharge glass melt into the interior of the fiberizing rotor. Portions of the figure are shown in section to more clearly illustrate the invention.

Figure 1:
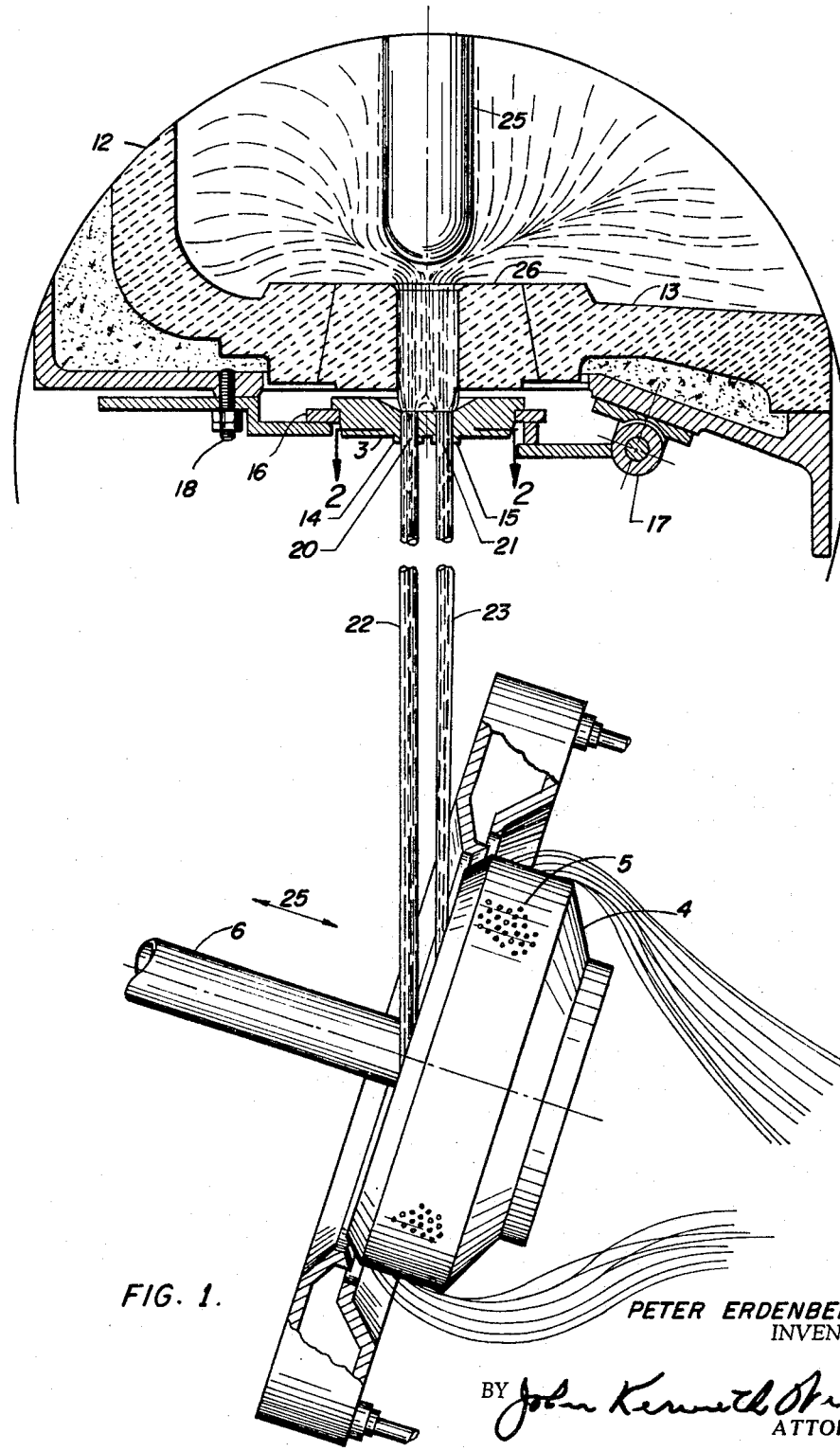

FIGURE 1 illustrates an enlarged sectional view of the forehearth discharge and the fiberizing rotor. The forehearth 12 has a bottom wall 13 and a primary bushing 26 through which the glass melt is released. A needle 25 adapted to be raised and lowered controls the flow of the glass melt through the primary bushing 26. The stream shaping bushing 3 is mounted on a support 16 and is rotatable therein. The support is hinged at 17 and fastened at 18 so that the bushing may be readily replaced if damaged. This bushing may have two or more orifices, two being shown at 20 and 21, but additional openings may be employed as shown in FIGURES 3, 4, 5 and 6. The bushing may be made of ceramic material or of metal such as Type 310 stainless steel. The stainless steel is preferred as it produces longer life and it is more resistant to wetting by the glass. In a preferred construction, small skirts or lips 14 and 15 are fabricated on the outlet of each orifice to assist in maintaining the separation of the segments of the stream.

Figure 2:
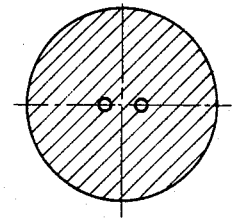
FIGURE 2 is a view taken along section line 2—2 of FIGURE 1.
Figure 3:
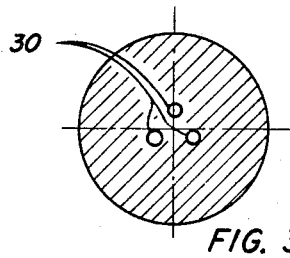
FIGURE 3 illustrates a plan view of a three hole form of bushing.
Figure 3A:
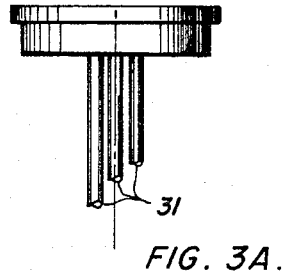
FIGURE 3A is a side elevation of the bushing of FIGURE 3.

The bushing shown in FIGURE 3 has three symmetrically located orifices 30 which, in some instances, may be preferred over the configuration shown in FIGURE 2, since as shown in FIGURE 3A, the projection of the segments 31 discharged by the orifices forms a nearly continuous stream of glass.

Figure 4:
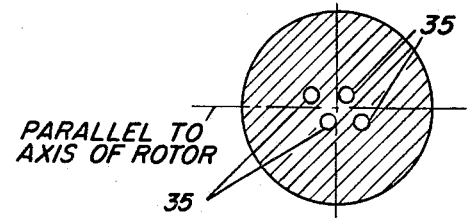
FIGURE 4 illustrates still another form of bushing.
Figure 5:
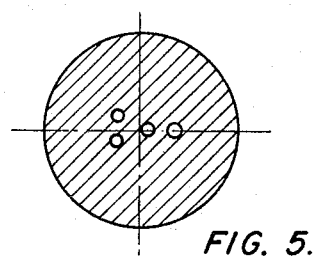
FIGURES 5 and 6 illustrate bushings to develop asymmetric streams of molten glass.
Figure 6:
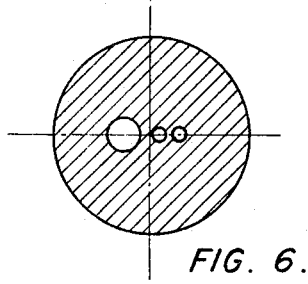
Figure 2A:
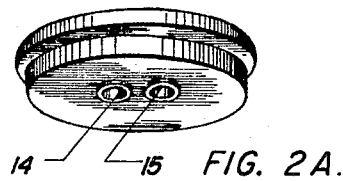
FIGURE 2A is a projected view of the bushing of FIGURE 2.

FIGURE 4 illustrates another embodiment in which the orifices 35 overlap along the plane of the axis of the rotor so that the projection of the segments on this plane presents a stream with no gaps. If it should be desired to utilize a stream having an irregular cross section or having portions of increased apparent density, the arrangement of the segments may be varied accordingly. Segments of larger and smaller dimensions may also be employed in combination. Bushings to develop such asymmetric streams are illustrated in FIGURES 5 and 6.

Beneath the bushing 3 is located the rotor 4 so that the stream segments 22 and 23 of the glass stream impinge on the interior of the rotor, intersecting the side wall in the area bearing the orifices 5. This exact area may be selected by adjusting the position of the rotor as shown by the double-headed arrow 25. To reduce the number of orifices 5 which intersect the streams of glass melt, the bushing 3 may be rotated, so that a plane passing through the streams 22 and 23 is at right angles to the shaft 6.

In operating the foregoing apparatus, the fiberizing rotor was located beneath the discharge port of the forehearth and was driven at high speed and brought to nearly operating temperature in a conventional manner. A supply of molten glass was established in the forehearth and when the rotor had reached the proper temperature, the needle 25 was raised to permit the glass to flow through the bushing and form segments of a stream which were deposited upon the interior of the rotor adjacent to the fiberizing orifices 5.

The flow of glass amounted to from about 500 to about 1500 lbs. per hour so that it is apparent that the stream segments were of substantial dimensions. When operated with a glass suitable for forming fibers at a temperature of 1800 to about 2200° F., desired flow was obtained with two orifices ⅝" in diameter on 1¼" centers. The rate of flow was controlled by adjusting the position of the needle 25 and also by carefully controlling the temperature of the glass melt. Those skilled in the art will readily understand the modifications necessary to achieve the desired flow rate.

The number of segments in the stream may be increased to about twelve or more, but then it is of course necessary to reduce the dimension of the segments if the total flow of glass is not to be changed. It is felt undesirable, however, to have the segment shaping orifices be less than about ¼" in diameter as the flow of glass through such an orifice becomes more difficult to control and radiation from the smaller diameter segments may be troublesome. It should be quite clear, therefore, that this bushing provides a stream having segments of very substantial glass content and must be distinguished from fiber forming orifice plates which it may superficially resemble. Moreover, the segments fall due to their own weight and no tractive forces are applied to the segments by the rotating fiberizing centrifuge.

It is clear, therefore, that there has been provided a method of forming a stream of glass of an apparent density which may be varied not only in magnitude but also in distribution within the stream, and a stream which does not have a circular cross section but resembles a flat ribbon in many of its properties and uses so that the glass melt may be uniformly distributed across the interior of the side wall of the rotor.

It is understood, of course, that this invention is not to be limited to the particular embodiment shown and described above, since many modifications may be made, and it is contemplated by the appended claims to cover such modifications as fall within the true spirit and scope of this invention.

What is desired to be claimed is:

1. Apparatus for forming fibers comprising a rotor including a side wall formed with orifices arranged over an annular area of substantial width, a shaft, said rotor being mounted on said shaft for rotation about the longitudinal axis thereof, said shaft being disposed at a substantial angle to the vertical whereby the inner surface of the lower portion of said annular area of said rotor is exposed upwardly, and a stream divider positioned above said rotor over said upwardly exposed inner surface, said stream divider having a plurality of spaced outlets over said upwardly exposed inner surface for discharging a plurality of discrete spaced stream segments of molten fiber forming material to said upwardly exposed inner surface in spaced relation to one another.

2. Apparatus as in claim 1 wherein said stream divider includes a downwardly extending lip at each of said outlets.

3. Apparatus as in claim 1 wherein said outlets of said divider are arranged to distribute such spaced stream segments uniformly across the width of said annular area.

4. Apparatus as in claim 1 wherein said outlets of said divider are arranged to discharge such spaced stream segments in a pattern such that the projections of said segments on a vertical plane parallel to the axis of rotation of said rotor are closely adjacent to one another.

5. Apparatus as in claim 1 wherein said outlets of said divider are arranged to distribute such spaced stream segments asymmetrically across the width of said annular area.

6. Apparatus as in claim 1 including a reservoir for molten fiber-forming material disposed above said rotor and having a discharge port over said upwardly exposed inner surface, said stream divider comprising a bushing positioned subjacent said discharge port and having a plurality of openings therethrough forming said outlets.

7. Apparatus as in claim 6 including means for supporting said bushing, said bushing being rotatable therein.

8. Apparatus as in claim 6 wherein the openings in said bushing are of equal size.

9. Apparatus as in claim 6 wherein the openings in said bushing are of different sizes and wherein the smallest of said openings is at least about one fourth inch in diameter.

References Cited
UNITED STATES PATENTS

| 3,044,110 | 7/1962 | Hess | 65—14 |
| 3,233,989 | 2/1966 | Stalego | 65—14 |
| 3,304,164 | 2/1967 | Carpentier et al. | 65—5 |

DONALL H. SYLVESTER, *Primary Examiner.*

R. L. LINDSAY, *Assistant Examiner.*